(No Model.)  5 Sheets—Sheet 1.

C. V. ROTE.
AUTOMATIC CAR BRAKE.

No. 347,011.  Patented Aug. 10, 1886.

WITNESSES  INVENTOR (No Model.) 5 Sheets—Sheet 2.
C. V. ROTE.
AUTOMATIC CAR BRAKE.
No. 347,011. Patented Aug. 10, 1886.
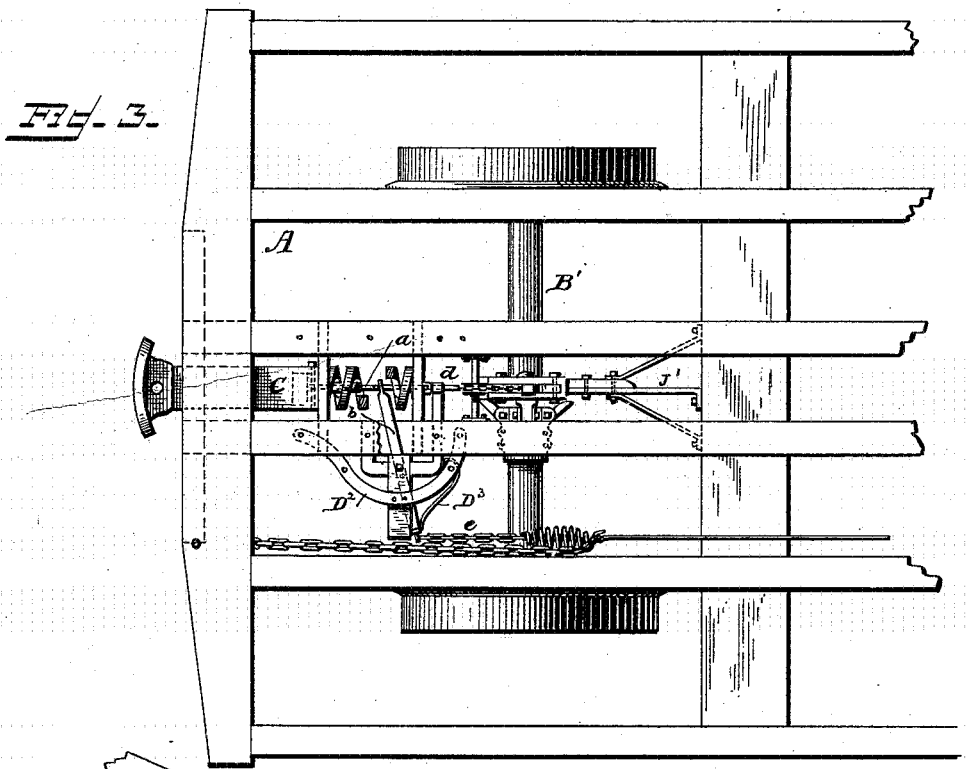
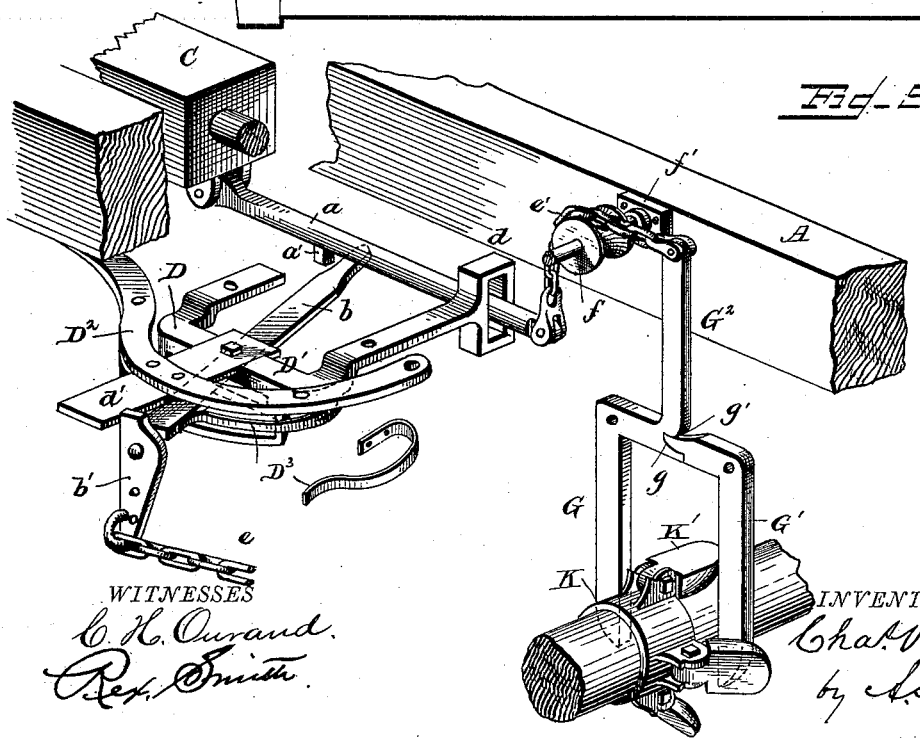

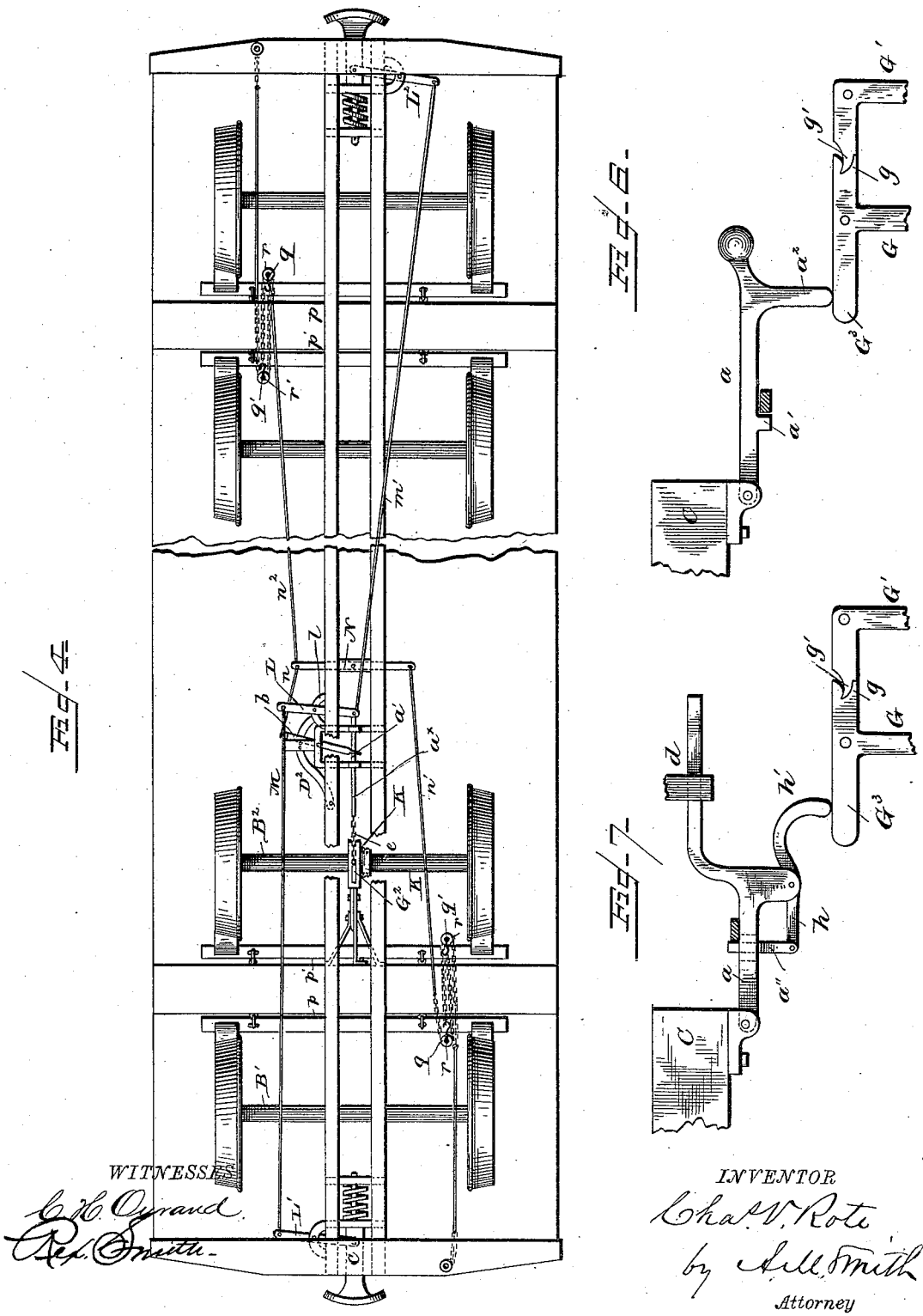

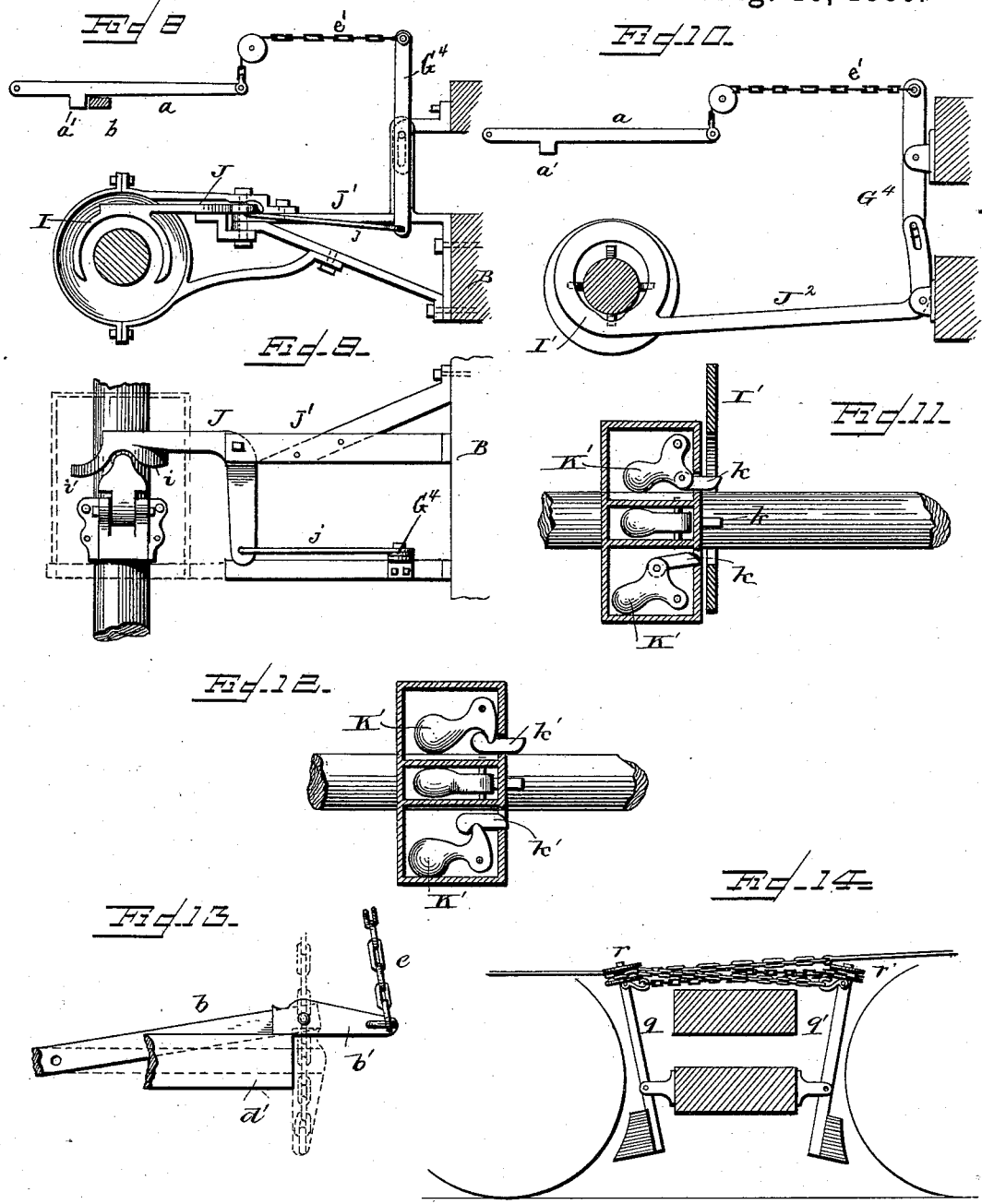

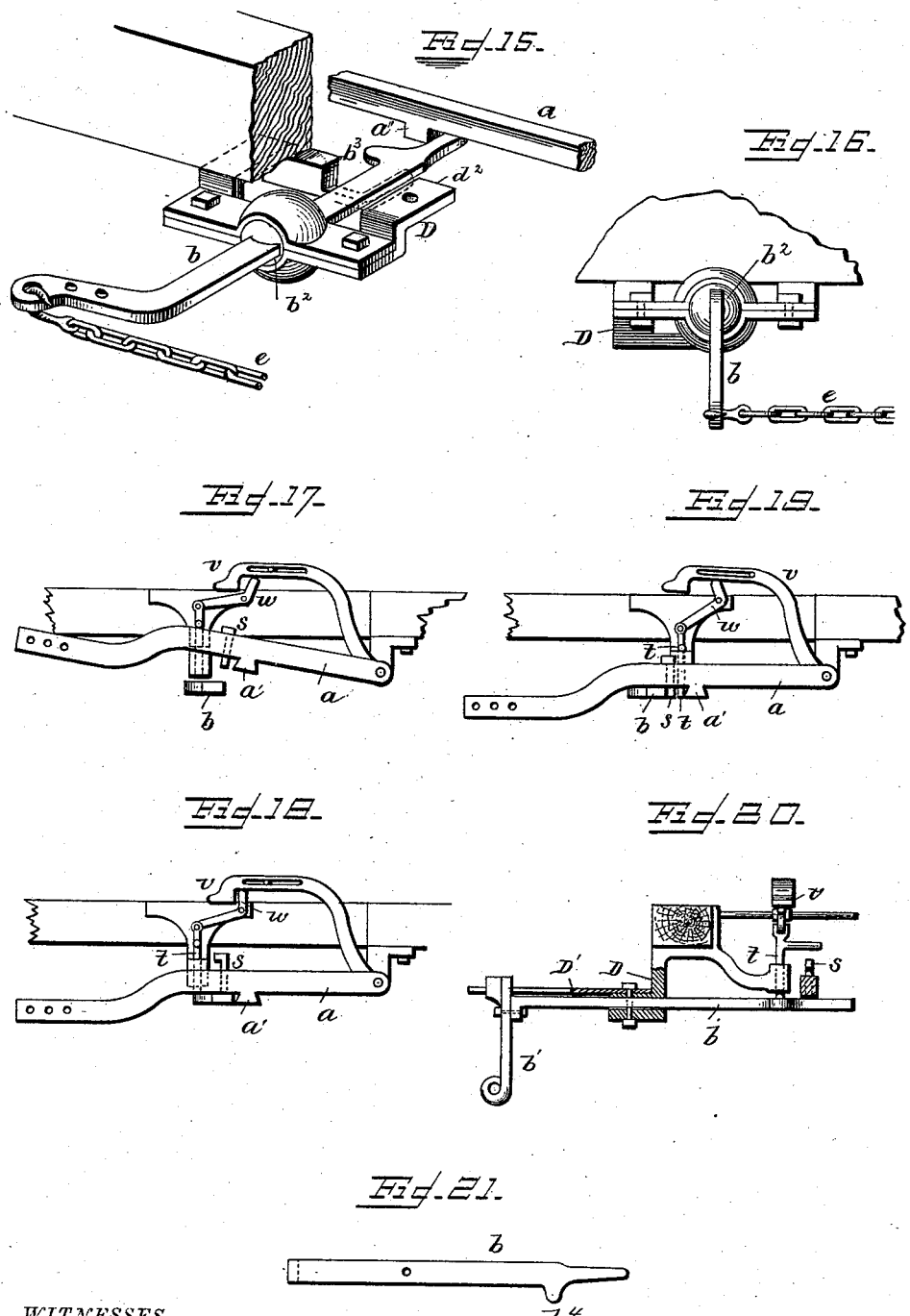

UNITED STATES PATENT OFFICE.

CHARLES V. ROTE, OF LANCASTER, PENNSYLVANIA, ASSIGNOR TO THE ROTE AUTOMATIC BRAKE COMPANY, OF MANSFIELD, OHIO.

AUTOMATIC CAR-BRAKE.

SPECIFICATION forming part of Letters Patent No. 347,011, dated August 10, 1886.

Application filed April 8, 1886. Serial No. 198,246. (No model.)

*To all whom it may concern:*

Be it known that I, CHARLES V. ROTE, of Lancaster, county of Lancaster, and State of Pennsylvania, have invented a new and useful Improvement in Automatic Car-Brakes, of which the following is a full, clear, and exact description, reference being had to the accompanying drawings, making part of this specification.

The invention relates to that class of brake mechanism in which the sliding draw-bar or buffer is the prime motor, and the power of which is utilized or rendered inoperative, so far as any braking action is concerned, by the aid of a governor on one of the axles, controlled by centrifugal action, and of gravity stops or levers.

It consists in a novel arrangement of pivoted bar and stop in connection with the sliding draw-bar or buffer and levers through which the connection is made with the governor and brake mechanism; in a novel construction of the governor and of the levers through which the draw-bar acts on the brakes, and also of those through which said governor acts to relieve the brake mechanism to prevent its being acted upon by the sliding draw-bar, as will be explained.

The mechanism is of that type or class which is set by gravity to cause the draw-bar or buffer to act upon the brakes whenever the speed of rotation of the axle is sufficient to throw the governor-arms outward from the axle by centrifugal action, and thereby to release or leave the brake-setting mechanism free to act by gravity, and is relieved whenever the axle is at rest or moves so slowly that the governor-arms are no longer held outward by such centrifugal action, and will be understood by reference to the accompanying drawings, in which—

Figure 1:
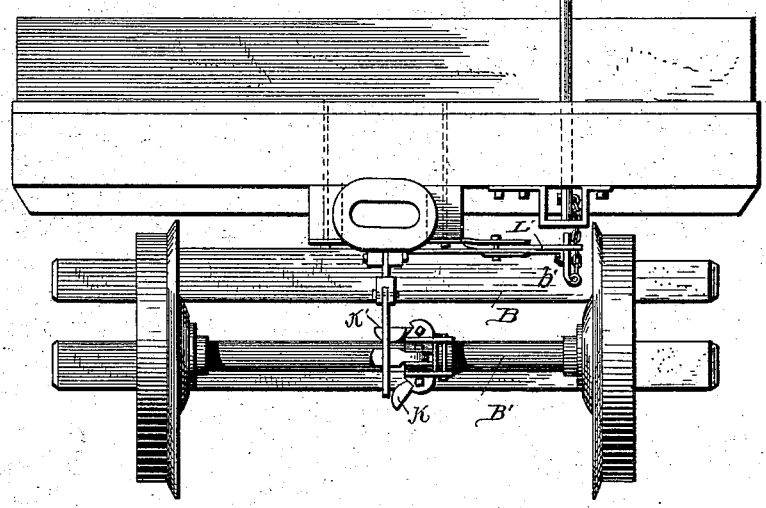
Figure 2:
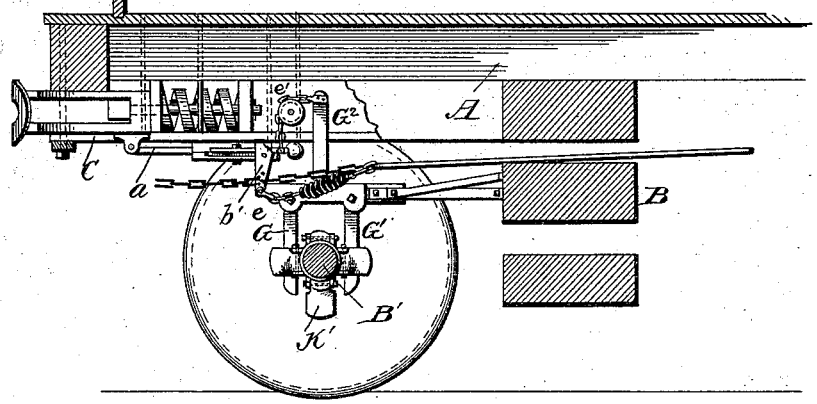

Figure 1 represents an end elevation of so much of a car as is necessary to show the invention; Fig. 2, a longitudinal vertical section through a portion thereof, showing the brake mechanism in side elevation; Fig. 3, a plan view with a portion of the car-platform broken away to more clearly show the brake mechanism; Fig. 4, a plan view of a platform-frame of a car with its two trucks, the governor being shown applied to the inner axle of one of the trucks, with connections thence with both draw-bars of the car and with the brakes of both trucks. Fig. 5 is a perspective view of the pivoted bar attached to the draw-bar and of the levers connected therewith. Figs. 6, 7, 8, 9, 10, 11, 12, 13, 15, 16, 17, 18, 19, 20, and 21 are detail views showing modifications in the form and arrangement of levers for relieving the brake mechanism and of the governor acting thereon, and Fig. 14 is a side elevation showing the arrangement of the brake-bar, levers, and chains.

A indicates a portion of the platform-frame, B a portion of one of the truck-frames, and B' B² the axles thereof, which parts, together with the wheels connected with said axles and the sliding draw-bar C, may be of any usual or preferred construction and arrangement.

The draw-bar has pivoted to its face, through suitable lugs or ears, the outer end of a rod or bar, $a$, which is upheld at its inner end by a loop or vertically-slotted bracket, $d$, secured to the platform-frame, and in which said bar $a$ is free to slide longitudinally and also to rise and fall within certain limits, as will be explained. The bar $a$ is provided with a spur or projection, through which it is adapted to act on a brake-lever, $b$, pivoted at or near the center of its length in a bracket, D, rigidly secured to the under side of the platform-frame. The bracket D may be made in any suitable form; but that shown, which is substantially U shape, placed flatwise and provided with the loop $d$ upon one end of one of its arms, as shown in Fig. 5, is preferred. Its closed end D', to the lower face of which the brake or power lever $b$ is pivoted, is slightly depressed to remove it from contact with the platform, and has a seat formed in its upper face, in which is secured a laterally-projecting arm or bar, $d'$, which serves as a stop or means for actuating a "take-up" lever, $b'$, pivoted on the outer end of the vibrating brake-lever, $b$. The arm $d'$ may, if desired, be formed upon the bracket D; but it is preferred to make it separate, and to secure it in a seat or socket in the bracket by the same bolt which serves to connect the brake-lever pivotally therewith.

D² is a curved brace rigidly secured to the platform-frame and to the upper face of the arm or bar $d'$ just inside of the path of the take-up lever $b'$, so as to be out of the way of the latter, and serving to stiffen said arm and support it rigidly against the thrust or blows of said take-up lever. The brace $D^2$ has a pendent loop or slotted portion, $D^3$, in which the lever $b$ moves, and which serves to uphold the outer end of said lever and prevent its being thrust or forced downward and away from the arm $d'$ by the action of the take-up lever $b'$. The outer end of the brake-lever $b$ has by preference a short pendent lip or flange formed upon it, and the lever $b'$ is connected by a horizontal pivot to the outer vertical face of said flange or end of lever $b$, with its short arm projecting upward so as to come in contact with the arm or bar $d'$ as the lever $b$ is vibrated to act upon the brakes. The long pendent arm of the lever $b'$ is provided with a hook or eye, from whence a chain extends to the brake rod or chain, as indicated. The longer pendent arm of lever $b'$ may have a series of eyes or perforations at different distances from its fulcrum, and through any one of which the brake rod or chain $e$ may be connected with it for varying the amount of take-up, as may be required.

The inner end of lever $b$ projects within the path of the spur or projection $a'$, or the rod or bar $a$ when the latter is in its normal position, and in such position when the draw-bar or buffer to which said rod or bar $a$ is connected is thrust inward by coming in contact with another draw-head or buffer, the lever $b$ will be vibrated, and, carrying the lever $b'$ into contact with the fixed arm or bar $d'$, the lever $b'$ will be vibrated from its vertical to a horizontal position, adapting it to pass under the arm $d'$, and in being so vibrated it serves to take up any slack in the brake rod or chain, after which the further movement of the lever $b$ will be utilized in applying the brakes in a manner that will be readily understood.

For relieving the brake mechanism or freeing it from the action or inthrust of the draw-bar, the inner end of the bar $a$ has one end of a cord or chain, $e'$, connected with it, said cord or chain extending up over a pulley, $f$, journaled in a suitable bracket, $f'$, secured to the platform-frame, the other end of the chain being connected with an upright arm, $G^2$, on one of the pendent angular levers G and G', upon which the governor on the axle acts to relieve the brake mechanism, as will appear.

The levers G and G' are made in elbow or bell-crank form, with their long arms pendent, and are pivoted each at the elbow, with their horizontal arms turned inward toward each other, and the end of one has a notch formed in it at $g$, and the other has a corresponding tooth or spur, $g'$, formed upon it, which enters the notch $g$, thereby coupling the two levers and causing a vibratory movement of either to act upon the arm $G^2$, formed on the lever G. By this arrangement, when the levers G and G' are vibrated or thrown outward or away from the axle by the action of the governor, the arm $G^2$ acts through the chain $e'$ to lift the inner end of the rod or bar $a$ sufficiently to cause the spur or projection $a'$ to pass freely by or over the end of lever $b$ without acting thereon, and consequently without acting on the brakes.

In Fig. 6 a modification is shown, by which the chain and pulley in the relieving device above described are dispensed with. The lever G is provided with a horizontal arm, $G^3$, instead of the upright arm $G^2$, and a pendent spur, $a^2$, on the free inner end of the rod or bar $a$ rests thereon in such manner that as the lever G is vibrated outward the arm $G^3$ will rise and lift the bar $a$ sufficiently to cause the spur $a'$ to pass over the lever $b$ without actuating it; and in Fig. 7 the bar $a$ simply moves longitudinally, and the pin or spur, instead of being formed thereon, is in the shape of a pin or rod, $a''$, pivoted at one end to a lever, $h$, and adapted to slide up and down in a slot or perforation in the rod or bar $a$. The lever $h$ is pivoted in suitable lugs on the lower face of the bar $a$, and at its inner pendent end, $h'$, rests on the arm $G^3$ in such manner that as the arm $G^3$ is vibrated the pin $a''$ will be thrust up through the bar $a$ to engage the lever $b$, which in this construction is shown arranged above and resting on the bar $a$, or the pin $a''$ will be withdrawn to allow it to move by the brake-lever without acting upon it.

In Figs. 8 and 10 an arrangement of chain or cord and pulley in the relieving device similar to that above described is shown; but different forms of governor and lever-connections are employed. Thus in Figs. 8 and 9 the governor is shown composed of a series of weighted arms, $K'$, merely, pivoted in suitable lugs on a sleeve or collar, K, fast on the axle, and adapted to be thrown outward by centrifugal action. On the side on which these arms fall inward toward or against the axle, when the speed of rotation of the latter becomes sufficiently slow to permit such action, is arranged a pendent U-shaped wave-cam, I, partly surrounding the axle loosely and secured to and upheld by the longitudinal arm of a bell-crank lever, J, pivoted at its elbow in a bracket, J', secured to one of the transverse bars of the truck-frame. The portion of this cam I most distant from the governor-sleeve K is over the axle, while the portions of said cam in the same horizontal plane with the axle are nearest the sleeve K, as indicated in the side and plan detail views, Figs. 8 and 9. By this arrangement it will be seen that the weighted governor-arms will be allowed to fall in upon the axle when passing over the same, and as they pass around to the side of the axle they will crowd the cam I away from the sleeve K, and thus vibrate the lever J, the transverse arm of which is connected by a rod, $j$, with the lower end of an upright lever, $G^4$, from which the chain extends to the inner end of bar $a$, for lifting it and relieving the brake mechanism. The portion $i'$, being farther from the fulcrum of lever J than part $i$, is made to project a little nearer to the sleeve K than said part $i$, to equalize the throw of the lever J, whether one or the other is acted on by the governor.

In Figs. 10 and 11 the governor is shown composed of weighted arms K′, as above described; but to suitable lugs on these arms tongues $k$ are pivoted, which, by the vibration of the weighted arms as the latter fall inward on the axle, are thrust out laterally, sliding lengthwise of the axle and entering a ring, I′, which, like ring I, surrounds the axle, but which, instead of being a wave-ring, in its normal condition stands in eccentric relation thereto, as indicated in Fig. 10, in which position the tongues $k$ readily enter the ring when on the upper side of the axle, and as they rotate with the axle they serve to crowd the ring downward, and thus to vibrate downward the horizontal arm of a bell-crank lever, $J^2$, the upright arm of which has a slot-and-pin connection with the lever end of a lever, G⁴, which is connected with the bar $a$, as shown, for operating it, as above explained. In this construction of the governor the weighted arms are preferably inclosed within a box or casing, which serves to confine their movements within certain limits, but sufficiently extended to permit the tongues to be thrust out through openings in the side of the casing and within the ring I′, for acting thereon, and to be withdrawn, so as not to act thereon, as shown in Fig. 11. This limitation is especially necessary in a construction such as is shown in Fig. 12, where a tongue or spur on the weighted governor-arm enters a notch or depression on the outer face of a tongue or slide, $k'$, adapted to move in suitable ways in the casing. The action of the slide $k'$, as indicated in Fig. 12, is similar to that of the tongue $k$ of Fig. 11.

If preferred, the construction of the governor may be the same as is described in the pending application filed by Charles V. Rote, March 15, 1886, Serial No. 195,318; or any other suitable form of governor may be employed, so long as it is adapted to act through connecting devices, substantially as described, to relieve the brake-actuating mechanism; but it is preferred to inclose the governor in a suitable casing, as described, and thereby to protect it from injuries.

The take-up lever $b'$, it will be obvious, may be set to vibrate in a horizontal plane, as shown in Fig. 1, instead of in a vertical one, as described, and it may be made in any suitable form, whether used in one or the other position.

In Fig. 4 the governor is shown applied to the inner axle, $B^2$, of one of the trucks instead of to the outer axle, B′, thereof, as has been usual, and in this case the bar $a$, (indicated in this figure by $a^\times$,) carrying the spur $a'$, instead of being pivoted directly to the sliding draw-bar or buffer, is pivoted to one end of a transverse lever, L, pivoted at or near the center of its length in a suitable bracket, $l$, secured to the lower side of the platform-frame near the center of the latter, both longitudinally and transversely. The opposite end of this lever L is connected by a rod, $m$, with the outer end of a lever, L′, pivoted near the center of its length to the platform-frame on one side of the draw-bar, and having its inner end pivoted to and moving with the sliding draw-bar or buffer, the arrangement being such that when the draw-bar is moved longitudinally the bar $a^\times$ will be correspondingly moved, and in the same direction. It is connected with the governor and operates in the same manner as above described, differing only in the arrangement or location of the parts. $b$, as in the description of the other figures, indicates the brake-lever, which is acted upon by the sliding bar $a^\times$, and at its opposite end to that so acted upon is connected by a chain or rod, $n$, with one end of a centrally-arranged transverse lever, N, the ends of which are connected by rods and chains $n'$ $n^2$, one with the ordinary brake-lever arrangement of one of the trucks and the other with that of the other truck, as indicated, and the lever L, which connects with the sliding bar $a^\times$, is also connected at one end, through the rod M, with the lever L′, pivoted to one of the draw-bars, as explained, and at its opposite end, through a similar rod, $m'$, to a similar lever, $L^2$, at the opposite end of the car, and connected with the draw-bar at said end, as shown. The brake-bars are indicated at $p$ $p'$, and the levers directly connected therewith for actuating said bars to apply the brakes at $q$ $q'$. The chains forming a portion of each of the connections between the central lever and the brake-bar levers $q$ and $q'$ pass each around a pulley, $r$, on the outer lever, $q$, and connect at their ends with the inner lever, $q'$, while the chains connecting the ordinary hand-wheel shafts pass each around a pulley, $r'$, on the inner brake-lever, $q'$, and have their ends secured to the outer brake bar levers, $q$. (See Fig. 14.) By this arrangement, whenever, by the inthrust of the draw-bar at either end of the car, the brake-lever $b$, under the arrangement shown in Fig. 4, is vibrated, the brakes of both trucks will be put in operation, and will continue to operate until the inthrust of the draw-bar ceases or the speed of the train is sufficiently reduced to cause the brake-relieving mechanism to act and lift the spur or pin of bar $a$ or $a^\times$, as the case may be, out of engagement with the brake-lever $b$, and that without in any way interfering with the application of the brakes by hand-power, and in the usual manner, at any time when it is desired to so apply them.

A curved spring (indicated at $D^3$, Fig. 5) secured at one end to the bracket D, and with its free end resting against the lever $b$, serves to take up any unnecessary slack in the brake rod or chain $e$, and to hold the brake-lever $b$ in proper position to be acted upon by the bar or rod $a$.

In Figs. 15 and 16 the brake-lever and the take-up lever are shown combined in one in the form of an elbow-lever, having a ball-and-socket fulcrum or pivot at $b^2$ in the bracket D, which adapts its short arm to rock up from the pendent position shown in Fig. 16, in which it affords all necessary "slack" to the brake-chain $e$, to the horizontal position shown in Fig. 15, for taking up such slack preparatory to applying the brakes. This movement is effected by means of a spur, $b^3$, on the transverse arm of the lever coming in contact with an inwardly-projecting arm of foot $d^2$ of the bracket D.

Figs. 17, 18, 19, and 20 show a modification of the rod or bar $a$, pivoted at one end to the draw-bar. Fig. 17 represents the parts when the car is at rest with the spur on the rod $a$ raised by the governor, so as to relieve the vibrating brake-bar $b$. Fig. 18 represents the same parts with the car at speed with the spur on the rod $a$ down in front of the brake-bar $b$, ready for braking, but the draw-bar not drawn out far enough to allow a pin, $s$, to also fall down in front of the brake-bar $b$. The draw-bar can be drawn out far enough by compressing the spring in the draw bar for the pin $s$ to also fall down in front of the brake-lever $b$, in which case the brake is applied by the recoil or relax of the draw-bar spring. This enables the brake to be automatically applied in case the train parts. This pin $s$ also acts in taking up the slack as it increases from wear and other cause in the buffer or draw-bar spring. Fig. 19 represents the draw-bar compressed to its fullest extent putting on brake. The brake-lever $b$ is vibrated past a pin, $t$, (that in its normal position extends down through a bracket fastened to the car-timbers at one side of the bar $a$, and rests on the brake-lever $b$,) and the pin $t$ drops down in front of the brake-lever $b$ and locks it in this position until the governor releases it by raising the bar $a$, or until the draw-bar is pulled out sufficiently to relieve the pin $t$ by means of the arm $v$, fastened to the draw-bar, and extending up and coming in contact with a bell-crank, $w$, to which the pin $t$ is attached.

Fig. 20 represents an end view of the parts shown in Figs. 17, 18, and 19, and Fig. 21 represents a plan view modification of the lever $b$, showing extension $b^4$ for the pins $s$ and $t$, and to rest upon when not in action.

In Figs. 8 and 9 the casing for the governor is shown connected with and held stationary by the bracket on the truck-frame, instead of being secured to and rotating with the axle, as in the other figures.

Having now described the invention, what is claimed as new is—

1. The combination, with a sliding draw-bar, of the bar $a$, connected by a horizontal pivot with the draw-bar and provided with a vertically-projecting spur or pin, the brake-lever acted upon thereby, and means, substantially as described, for vibrating said bar $a$ vertically and changing the path of said spur or pin relative to the brake-lever, substantially as and for the purpose described.

2. The combination, with the sliding rod or bar pivotally connected with and actuated by the sliding draw-bar or buffer, of the combined brake and automatically-actuated take-up lever, arranged and operating substantially as described.

3. The combination, with the brake-lever, of the pivoted take-up lever and a stop whereby said take-up lever is automatically actuated for taking up the slack in the brake rod or chain, substantially as described.

4. The combination, with the sliding draw-bar or buffer, of the sliding rod or bar having the projecting pin or spur, the brake-lever actuated thereby, the take-up lever pivoted to and moving with said brake-lever, and a fixed stop for automatically vibrating said take-up lever, substantially as described.

5. The combination, with the longitudinally-sliding bar pivotally connected with and actuated by the draw-head and the brake-lever actuated thereby, of the governor-actuated lever and the cord or chain connecting the latter with the pivoted sliding bar, substantially as and for the purpose described.

6. The combination, with the governor on the axle for relieving the brake mechanism, of the pendent elbow-levers G and G', pivoted at their elbows or angles, and provided with arms having interlocking ends and an arm acting upon the brake-relieving mechanism, substantially as described.

7. In a brake-actuating mechanism, the combination, with the sliding draw-bar, of the brake-lever $b$, the take-up lever $b'$, pivoted thereto, and an arm or stop, $d'$, for actuating said take-up lever, substantially as described.

8. The combination, with the brake-lever, of the automatically-actuated take-up lever, provided with a series of eyes or perforations permitting the adjustment of the connection of the brake rod or chain therewith, substantially as and for the purpose described.

9. The combination, with the sliding draw-heads, of the levers L' and L² and the intermediate lever, L, connected therewith and with the sliding bar actuating the brake-lever, whereby the brakes of both trucks are connected to be operated simultaneously and from the draw-bar at either end of the car, substantially as described.

10. The combination, with the sliding rod or bar actuated by the draw-bar or buffer, of the brake-lever actuated by a pin or spur connected with said sliding bar, and a sliding pin, $s$, also connected with said sliding bar, and operating substantially as described.

11. The combination, with the brake-lever $b$ and the sliding rod or bar $a$, connected with the sliding draw-bar or buffer, for actuating said lever, of the sliding stop or pin $t$ and means connected with said sliding bar $a$ for disengaging said pin from the lever $b$, substantially as described.

12. The combination of the sliding bar $a$, connected with and operated from the draw-bar or buffer, and provided with the pin or spur for actuating the brake-lever, the brake-lever $b$, and the spring $D^3$, acting on said brake-lever, substantially as described.

In testimony whereof I have hereunto set my hand this 24th day of March, A. D. 1886.

CHAS. V. ROTE.

Witnesses:
GEORGE BRINKERHOFF,
CHAS. F. HARDING.